(12) United States Patent
Ho et al.

(10) Patent No.: US 8,714,850 B2
(45) Date of Patent: May 6, 2014

(54) BACKLIGHT MODULE AND LIGHTING KEYBOARD

(75) Inventors: Hsin-Cheng Ho, Taoyuan (TW); Liang-Yu Yao, Taoyuan (TW)

(73) Assignee: Darfon Electronics Corp., Gueishan, Taoyuan (TW)

( * ) Notice: Subject to any disclaimer, the term of this patent is extended or adjusted under 35 U.S.C. 154(b) by 309 days.

(21) Appl. No.: 12/977,080

(22) Filed: Dec. 23, 2010

(65) Prior Publication Data

US 2011/0158728 A1    Jun. 30, 2011

(30) Foreign Application Priority Data

Dec. 28, 2009   (TW) .............................. 98145261 A

(51) Int. Cl.
*B41J 5/08* (2006.01)
(52) U.S. Cl.
USPC ............................ 400/472; 200/314; 345/170
(58) Field of Classification Search
USPC ........................................................ 400/472
See application file for complete search history.

(56) References Cited

U.S. PATENT DOCUMENTS

| | | | |
|---|---|---|---|
| 5,138,119 A * | 8/1992 | Demeo | 200/314 |
| 5,225,818 A | 7/1993 | Lee | |
| 5,975,711 A * | 11/1999 | Parker et al. | 200/314 |
| 7,005,595 B1 * | 2/2006 | Tang | 200/310 |
| 7,154,059 B2 * | 12/2006 | Chou | 200/314 |
| 7,206,040 B2 | 4/2007 | Kano | |
| 7,260,888 B2 * | 8/2007 | Hsu et al. | 200/520 |
| 7,294,803 B2 * | 11/2007 | Lee et al. | 200/314 |
| 7,455,415 B2 * | 11/2008 | Miyahawa et al. | 362/30 |
| 7,841,791 B2 * | 11/2010 | Iso | 400/472 |
| 7,852,546 B2 * | 12/2010 | Fijol et al. | 345/108 |
| 7,876,489 B2 * | 1/2011 | Gandhi et al. | 359/242 |
| 8,253,598 B2 * | 8/2012 | Ho | 200/314 |
| 2006/0042921 A1 | 3/2006 | Saitoh | |
| 2009/0173610 A1 * | 7/2009 | Bronstein et al. | 200/314 |
| 2009/0260965 A1 * | 10/2009 | Chang | 200/314 |

FOREIGN PATENT DOCUMENTS

| | | |
|---|---|---|
| CN | 101192478 A | 6/2008 |
| CN | 201181661 Y | 1/2009 |
| CN | 201218465 Y | 4/2009 |
| CN | 101483108 A | 7/2009 |
| KR | 100689395 B1 | 3/2007 |
| TW | 200708214 | 2/2007 |
| TW | 200945114 | 11/2009 |

\* cited by examiner

*Primary Examiner* — Jill Culler
(74) *Attorney, Agent, or Firm* — Winston Hsu; Scott Margo

(57) ABSTRACT

A backlight module is used in a lighting keyboard. The backlight module includes a light guiding plate and a masking. The masking is disposed on the light guiding plate. The masking includes a support layer, a cover layer and a reflective layer. The support layer includes a first surface and a second surface opposite to the first surface. The cover layer is disposed on the first surface. The cover layer includes a first opening. The reflective layer is disposed on the second surface and faces the light guiding plate for reflecting light emitted from the light guiding plate, so as to enhance lighting efficiency on the first opening. The reflective layer includes a second opening. A shape and a position of the second opening are respectively corresponding to a shape and a position of the first opening.

17 Claims, 4 Drawing Sheets

BACKLIGHT MODULE AND LIGHTING KEYBOARD

BACKGROUND OF THE INVENTION

1. Field of the Invention

The invention relates to a backlight module and a lighting keyboard, and more particularly, to a backlight module and lighting keyboard utilizing a reflective layer to enhance lighting efficiency.

2. Description of the Prior Art

Recently, many information processing devices, such as, notebook computers, personal digital assistants (PDAs) and so on, have been developed as technology progresses in the variety of surroundings. For example, in a dark place users may not see numbers or characters marked on a keyboard. Therefore, it causes difficulty in reading. Even worse, users' vision might be impaired due to difficult reading. Lighting keyboards are available on the market for improving above problems. Besides, various disposals of light sources increase artistic feeling of the lighting keyboards, so as to increase market value.

A lighting keyboard is a non-spontaneous lighting device, so a backlight module is taken as a light source. Please refer to FIG. 1. FIG. 1 is a cross-sectional diagram illustrating a conventional lighting keyboard 1. As shown in FIG. 1, the lighting keyboard 1 includes a keyboard module 10 and a backlight module 12, and the keyboard module 10 is disposed on the backlight module 12. The backlight module 12 includes a light source 120 disposed in a light guiding plate 122, and the light source 120 emits light to the light guiding plate 122. A reflective component 124 disposed under the light guiding plate 122 reflects the light emitted through the light guiding plate 122 toward the keyboard module 10. Afterward, the light passes through the light guiding plate 122 and a predetermined position of the keyboard module 10, such as a transparent area on a keycap, so that users can see light projecting from the lighting keyboard 1.

Besides the transparent area on the keycap capable of being penetrated by light, some gaps are existed in original design of the keyboard module 10, such as some gaps between keyswitches. Therefore, light projected out of the light guiding plate 122 may be emitted through some unexpected positions to cause unexpected lighting effect. The unexpected lighting effect can be prevented by a masking of a backlight module. As shown in FIG. 1, a masking 126 is disposed between the light guiding plate 122 of the backlight module 12 and the keyboard module 10. The masking 126 has an opening 1260 (or a transparent area). When light is projected to the masking 126 from the light guiding plate 122, part of light is emitted through the opening 1260 to the keyboard module 10, and part of light is absorbed by the masking 126. Light is emitted out of some specific positions by the opening 1260 for preventing the unexpected lighting effect.

However, light mostly is absorbed by the masking. Therefore, lighting efficiency of the light source is not good. In order to maintain sufficient brightness, more light sources or light sources with higher brightness are required, so as to increase production cost of the backlight module and the keyboard.

SUMMARY OF THE INVENTION

Therefore, the present invention provides a backlight module and a lighting keyboard to solve the problems mentioned above.

According to the claimed invention, a backlight module is used in a lighting keyboard. The backlight module includes a light guiding plate and a masking. The masking is disposed on the light guiding plate. The masking includes a support layer, a cover layer and a reflective layer. The support layer includes a first surface and a second surface opposite to the first surface. The cover layer is disposed on the first surface. The cover layer includes a first opening. The reflective layer is disposed on the second surface and faces the light guiding plate for reflecting light emitted from the light guiding plate, so as to enhance lighting efficiency on the first opening. The reflective layer includes a second opening. A shape and a position of the second opening are respectively corresponding to a shape and a position of the first opening.

According to the claimed invention, the backlight module is adjacent to a keyboard module, wherein the cover layer of the masking faces the keyboard module.

According to the claimed invention, the position of the first opening is corresponding to a position of a keyswitch of the keyboard module.

According to the claimed invention, the backlight module further includes a light source for emitting light to the reflective layer through the light guiding plate.

According to the claimed invention, the light guiding plate includes a sunken part for accommodating the light source.

According to the claimed invention, the second opening is larger than the first opening.

According to the claimed invention, the backlight module further includes a reflecting plate disposed on a side of the light guiding plate opposite to the masking.

According to the claimed invention, a lighting keyboard includes a keyboard module and a backlight module. The keyboard module includes a keyswitch. The backlight module is disposed under the keyboard module. The backlight module includes a light guiding plate and a masking. The masking is disposed on the light guiding plate. The masking includes a support layer, a cover layer and a reflective layer. The support layer includes a first surface and a second surface opposite to the first surface. The cover layer is disposed on the first surface. The cover layer includes a first opening. The reflective layer is disposed on the second surface and faces the light guiding plate for reflecting light emitted from the light guiding plate, so as to enhance lighting efficiency on the first opening. The reflective layer includes a second opening. A shape and a position of the second opening are respectively corresponding to a shape and a position of the first opening.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
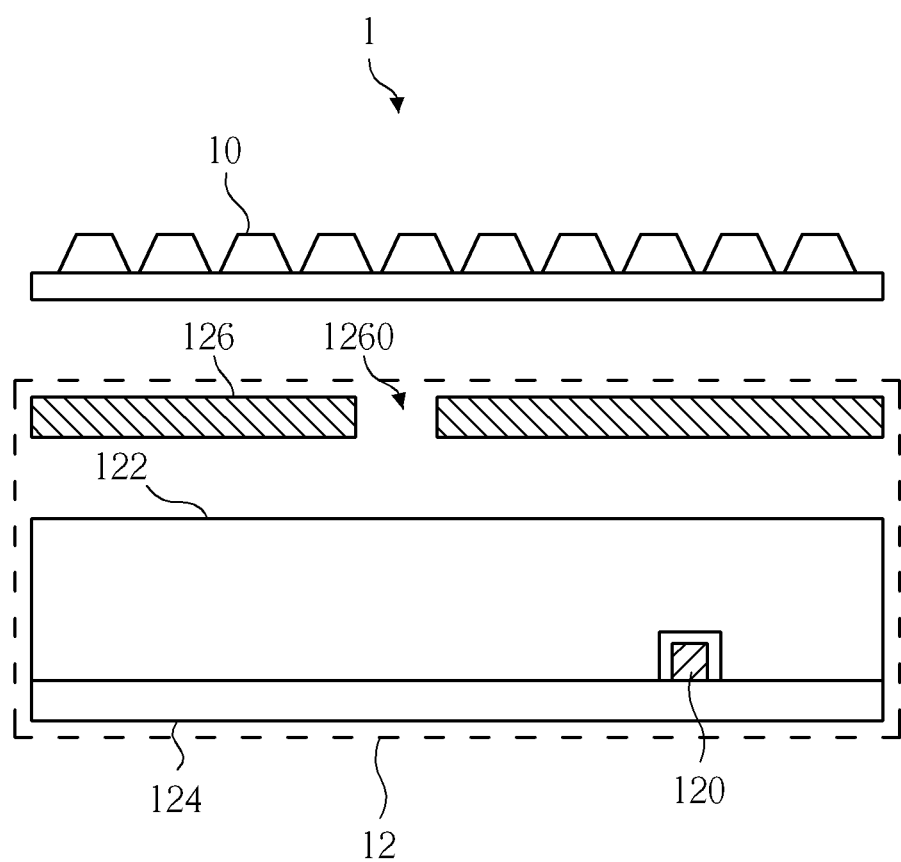
FIG. 1 is a cross-sectional diagram illustrating a conventional lighting keyboard.
Figure 2:
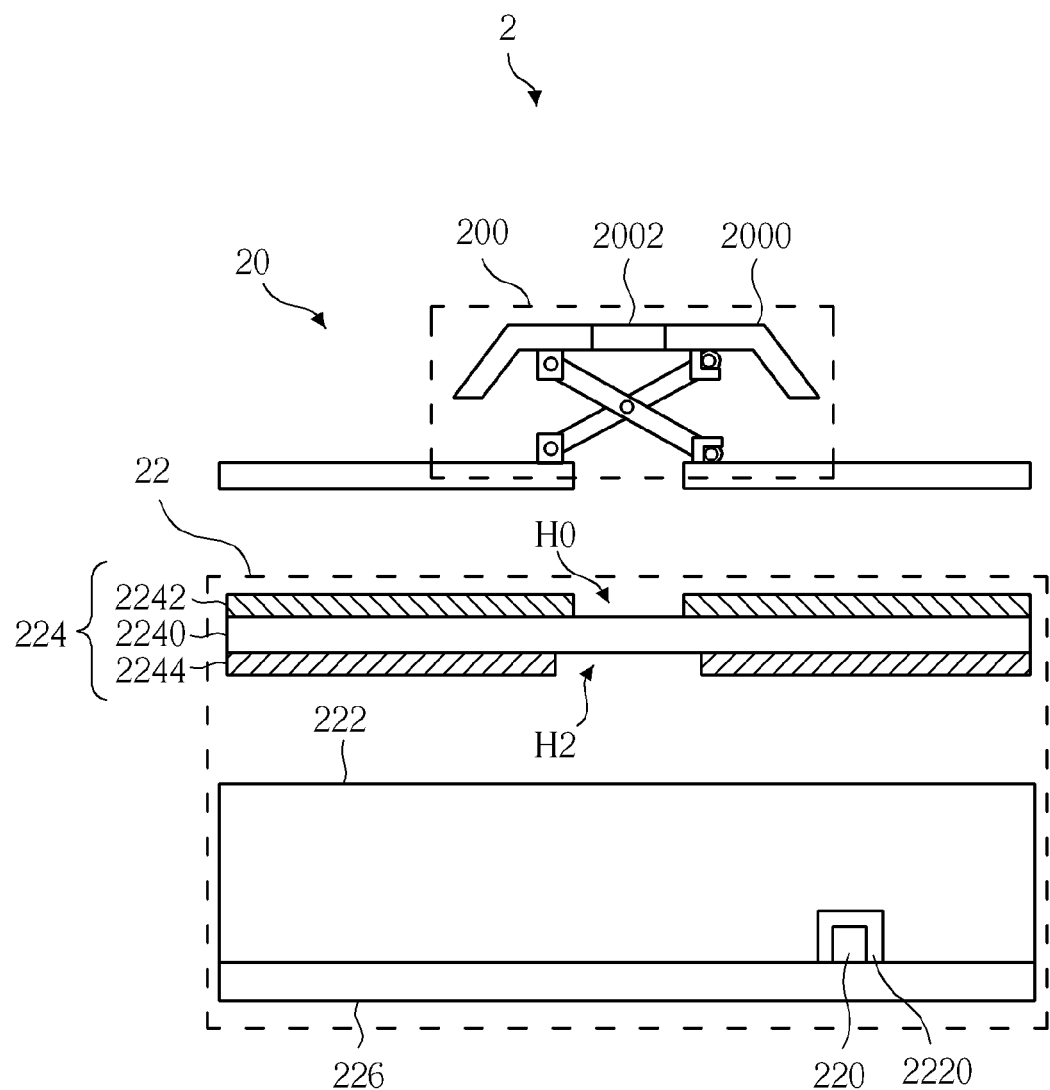
FIG. 2 is a schematic diagram illustrating a lighting keyboard according to an embodiment of the present invention.

Please refer to FIG. 2, and FIG. 2 is a schematic diagram illustrating a lighting keyboard 2 according to an embodiment of the present invention. As shown in FIG. 2, the lighting keyboard 2 includes a keyboard module 20 and a backlight module 22. The keyboard module 20 is disposed on the backlight module 22. In practical application, the backlight module 22 emits light toward the keyboard module 20. The light passes through a specific position of the keyboard module 20 and can be seen by a user.

In this embodiment, the backlight module 22 includes a light source 220, a light guiding plate 222 and a masking 224. The light source 220 is disposed in a sunken part 2220 of the light guiding plate 222 for emitting light through the light guiding plate 222, that is, the light emitted from the light source 220 travels toward the light guiding plate 222 and is guided by the light guiding plate 222. The masking 224 is disposed between the light guiding plate 222 and the keyboard module 20 and is adjacent to the light guiding plate 222. The masking 224 includes a support layer 2240, a cover layer 2242 and a reflective layer 2244.

The cover layer 2242 of the masking 224 is disposed on a first surface of the support layer 2240. The reflective layer 2244 is disposed on a second surface opposite to the first surface. A reflective surface of the reflective layer 2244 faces the light guiding plate 222. In this embodiment, the cover layer 2242 is adjacent to the keyboard module 20, and the reflective layer 2244 is adjacent to the light guiding plate 222. Besides, the backlight module 22 further includes a reflective plate 226 disposed on a side of the light guiding plate 222 opposite to the masking 224. The reflective plate 226 includes a reflective surface facing the light guiding plate 222.

The light source 220 emits light through the light guiding plate 222, and light is guided by the light guiding plate 222. When light is emitted through the light guiding plate 222, part of light travels toward the keyboard module 20 and part of light travels toward the reflective plate 226. Light emitted toward the reflective plate 226 is reflected by the reflective plate 226 to travel toward the keyboard module 20 due to the reflective surface facing the light guiding plate 222. In practical application, a reflective component with higher reflectivity can be added on the reflective plate 226 for enhancing reflectivity in a specific location, so as to improve brightness around the specific location of a backlight module.

In this embodiment, the cover layer 2242 of the masking 224 includes a first opening H0, and the reflective layer 2244 includes a second opening H2. A shape of the second opening H2 is roughly identical to a shape of the first opening H0, and a position of the second opening H2 is corresponding to a position of the first opening H0. In practical application, the position of the first opening and the position of the second opening are corresponding to an actual light emitting position of the keyboard module. The actual light emitting position depends on the design demand. Besides, the keyboard module 20 further includes a keyswitch 200, and a keycap 2000 of the keyswitch 200 has a light emitting opening 2002. A position of the light emitting opening 2002 is corresponding to the position of the first opening H0 and the position of the second opening H2. That is to say, the position of the light emitting opening 2002 is the actual light emitting position mentioned above.

In this embodiment, the light source 220 emits light through the light guiding plate 222. The light travels toward the keyboard module 20 through the light guiding plate 222. When light is emitted out of the light guiding plate 222 to the masking 224, part of light is reflected by the reflective layer 2244 and part of light passes through the second opening H2 to the support layer 2240. In practical application, the support layer 2240 can be made of transparent material or any other material capable of being penetrated by light. After light passes through the support layer 2240, part of light is absorbed by the cover layer 2242 and part of light passes through the first opening H0 of the cover layer 2242 to the keyboard module 20.

Light from the light guiding plate 222 is restricted to travel to the support layer 2240 via the second opening H2 with the reflective layer 2244 and the second opening H2. Afterwards, light with larger incident angle is absorbed by the cover layer 2242 so as to allow perpendicular incident light to pass through the first opening H0. Light can be restricted to emit out in a specific position with the reflective layer 2244, the second opening H2, the cover layer 2242 and the first opening H0. Because the light emitting opening 2002 of the keycap 2000 of the keyswitch 200 is corresponding to the first opening H0 and the second opening H2, light is emitted out of the lighting keyboard 2 through the light emitting opening 2002, instead of other unexpected positions, so as to prevent unexpected lighting effect.

It should be noted that the second opening H2 is larger than the first opening H0 in this embodiment. Accordingly, the luminous flux of the second opening H2 is larger or equal to the luminous flux of the first opening H0 for ensuring the brightness of the lighting keyboard 2. On the other hand, light not being emitted to the support layer 2240 from the second opening H2 can be reflected back and forth in the light guiding plate 222 by the reflective layer 2244 and the reflective plate 226, which is different from that light is mostly absorbed by the masking in the prior art. Accordingly, light reflected back and forth in the light guiding plate 222 of the backlight module 22 by the reflective layer 2244 and the reflective plated 226 can travel through the first opening H0 and the second opening H2 instead of being absorbed, so as to enhance lighting efficiency of the lighting keyboard 2 to prevent the problems in the prior art.

In practical application, the support layer 2240 can be made of transparent material, such as transparent resin. The cover layer 2242 can be a black ink layer, and the reflective layer 2244 can be a white ink layer. Furthermore, the masking 224 can be made of transparent resin with printing black ink and white ink on two surfaces thereon respectively.

Figure 3:
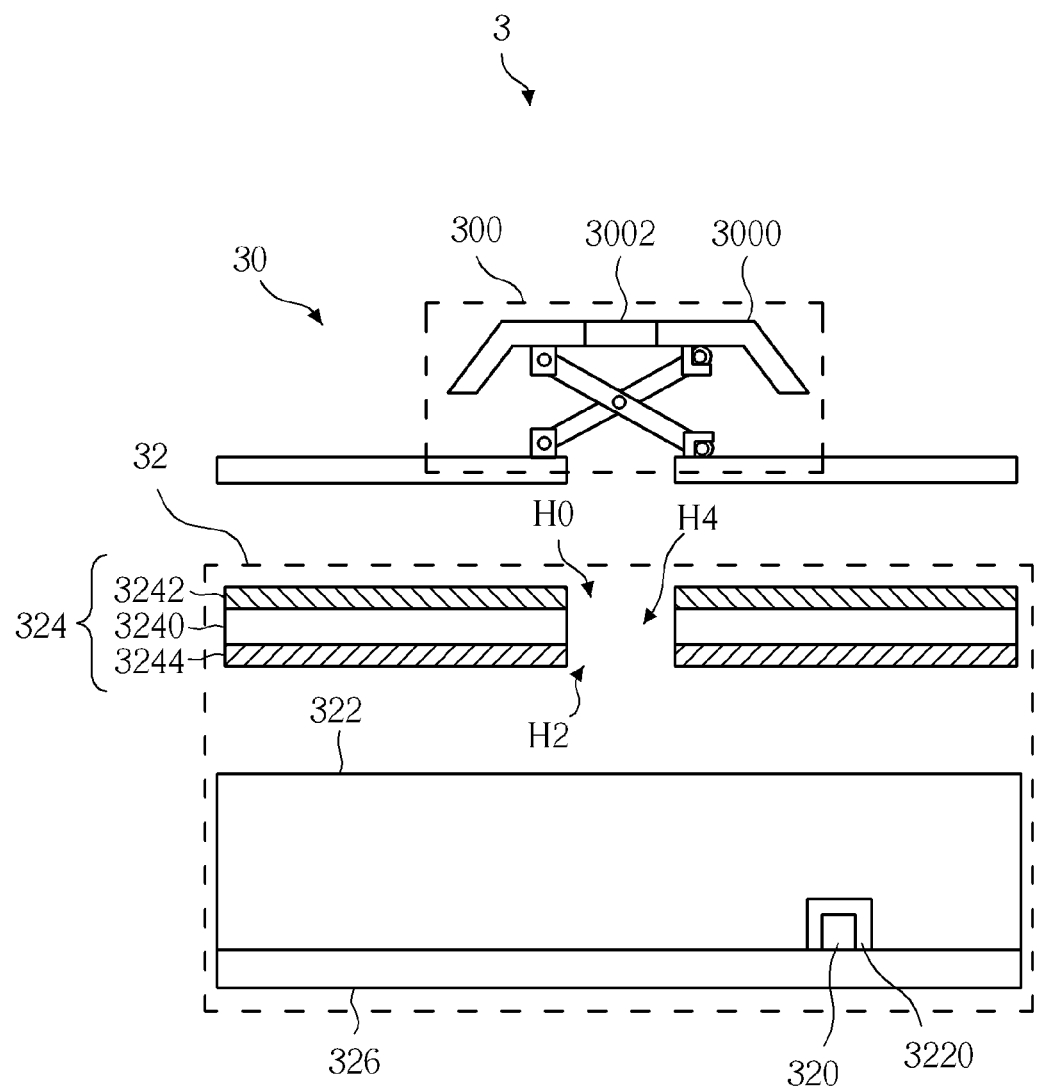
FIG. 3 is a schematic diagram illustrating a lighting keyboard according to another embodiment of the present invention.

It should be noted that an opening is required in the support layer corresponding to the first opening and the second opening as the support layer is made of opaque material. Please refer to FIG. 3. FIG. 3 is a schematic diagram illustrating a lighting keyboard 3 according to another embodiment of the present invention. As shown in FIG. 3, the difference between this embodiment and the foregoing embodiment is that a support layer 3240 is made of opaque material, and an opening H4 is formed on the support layer 3240 corresponding a first opening H0 and a second opening H2. Light is emitted through the support layer 3240 to a keyboard module 30 via the opening H4 despite that the support layer 3240 is not transparent. Other components of the lighting keyboard 3 of this embodiment are identical to ones of the embodiment mentioned above, so the details are not depicted herein.

Figure 4:
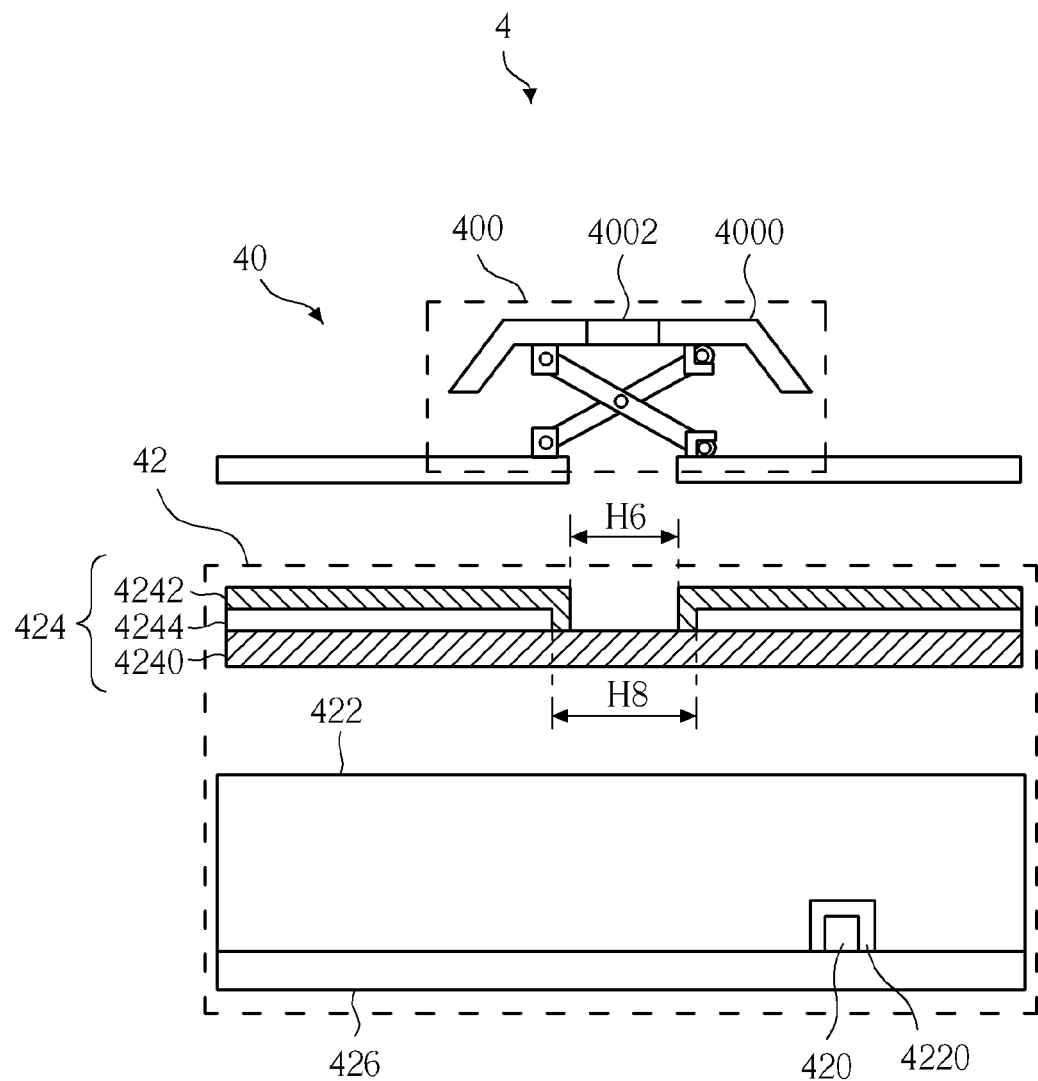
FIG. 4 is a schematic diagram illustrating a lighting keyboard according to another embodiment of the present invention.

Please refer to FIG. 4. FIG. 4 is a schematic diagram illustrating a lighting keyboard 4 according to another embodiment of the present invention. As shown in FIG. 4, the lighting keyboard 4 includes a keyboard module 40 and a backlight module 42, and the keyboard module 40 is disposed on the backlight module 42. The keyboard module 40 includes a keyswitch 400. The keyswitch 400 includes a keycap 4000, and a light emitting opening 4002 is on the keycap 4000. The backlight module 42 includes a light source 420, a light guiding plate 422, a masking 424 and a reflective plate 426. In this embodiment, the keyboard module 40, the light source 420 of the backlight module 42, the light guiding plate 422 and the reflective plate 426 are identical to ones of the embodiment mentioned above, so the details are not depicted herein.

The masking 424 includes a support layer 4240, a cover layer 4242 and a reflective layer 4244. The difference between this embodiment and the foregoing embodiment is that the reflective layer 4244 of this embodiment is disposed on the support layer 4240 and the cover layer 4242 is disposed on the reflective layer 4244. The cover layer 4242 has a first opening H6, and the reflective layer 4244 has a second opening H8. Shapes and positions of the first opening HE and the second opening H8 are corresponding to a shape and a position of the light emitting opening 4002 of the keyswitch 400. Besides, the second opening H8 is larger than the first opening H6.

In this embodiment, the light source 420 emits light through the light guiding plate 422. The light travels toward the keyboard module 40 via the reflective plate 426. The light emitted from the light guiding plate 422 to the support layer 4240 of the masking 424 can pass through the support layer 4240 to the reflective layer 4244 as the support layer 4240 is made of transparent material in this embodiment. Part of the light is reflected by the reflective layer 4244, and part of the light passes through the second opening H8 to the keyboard module 40. Only perpendicular incident light to the first opening HE can pass through the first opening HE to the keyboard module 40 because the second opening H8 of the reflective layer 4244 is larger than the first opening HE of the cover layer 4242. Rest of light emitted to the second opening H8 is absorbed by the cover layer 4242, such as light with a higher incident angle to the second opening H8 or perpendicular incident light toward an area covered by the cover layer 4242 to the second opening H8.

Light passing through the first opening HE and the light emitting opening 4002 of the keycap 4000 can be seen by a user. With the reflective layer 4244, the second opening H8, the cover layer 4242 and the first opening H6, light is emitted out of the lighting keyboard 4 through the light emitting opening 4002, instead of other unexpected positions, so as to prevent unexpected lighting effect. Besides, light not passing through the second opening H8 is restricted between the support layer 4240 and the light guiding plate 422 by the reflective layer 4244 and the reflective plate 426. Light reflected back and forth between the light guiding plate 422 and the support layer 4240 can pass through the first opening HE and second opening H8 later without being absorbed, so as to enhance lighting efficiency of the lighting keyboard 4 to prevent the problems in the prior art.

As mentioned above, the lighting keyboard and the backlight of the present invention utilize the reflective layer to reflect light not emitting at the predetermined positions, so as to keep light in the light guiding plate without being absorbed by the masking. Light restricted in the light guiding plate still can pass through the masking later, so as to enhance lighting efficiency of the backlight module. On the other hand, there is no requirement to dispose more light sources or light sources with higher brightness, so as to decrease production cost of the backlight module and the keyboard.

Those skilled in the art will readily observe that numerous modifications and alterations of the device and method may be made while retaining the teachings of the invention.

What is claimed is:

1. A backlight module used in a lighting keyboard, the backlight module comprising:
    a light guiding plate for guiding light; and
    a masking disposed above the light guiding plate, the masking comprising:
        a support layer comprising an upper surface and a lower surface opposite to the upper surface, the lower surface facing toward the light guiding plate;
        a reflective layer disposed on the upper surface, the reflective layer reflecting the light toward the light guiding plate, the reflective layer comprising a second opening; and
        a light absorbing layer disposed above the reflective layer, the light absorbing layer comprising a first opening, the second opening at least overlapping the first opening, so that the light passes through the masking from the lower surface to the upper surface by passing through an overlapped portion where the first opening and the second opening are overlapped;
        wherein a reflectivity of the reflective layer is higher than a reflectivity of the light absorbing layer, so that the reflective layer makes the light not entering the second opening substantially reflected back to the light guiding plate without being absorbed by the light absorbing layer.

2. The backlight module of claim 1, wherein a color of the light absorbing layer is substantially darker than a color of the reflective layer.

3. The backlight module of claim 2, wherein the light absorbing layer is substantially black and the reflective layer is substantially white.

4. The backlight module of claim 1, wherein a shape of the second opening is substantially same as a shape of the first opening.

5. The backlight module of claim 1, further comprising a reflecting plate disposed under the light guiding plate.

6. The backlight module of claim 1, wherein the support layer is made of transparent material, the support layer extends over the overlapped portion where the first opening and the second opening are overlapped, the light travels from the lower surface to the upper surface by passing through the support layer.

7. The backlight module of claim 1, wherein the support layer comprises a third opening at least overlapping the first opening and the second opening, the light travels from the lower surface to the upper surface by passing through an overlapped portion where the first opening, the second opening and the third opening are overlapped.

8. The backlight module of claim 1, wherein a center of the second opening substantially aligns with a center of the first opening.

9. A lighting keyboard comprising:
    a keyswitch;
    a light guiding plate for guiding light; and
    a masking disposed above the light guiding plate, the masking comprising:
        a support layer comprising an upper surface and a lower surface opposite to the upper surface, the upper surface facing toward the keyswitch, and the lower surface facing toward the light guiding plate;
        a reflective layer disposed on the upper surface, the reflective layer reflecting the light toward the light guiding plate, the reflective layer comprising a second opening;
        a light absorbing layer disposed above the reflective layer, the light absorbing layer comprising a first opening, the second opening at least overlapping the first opening, so that the light passes through the masking from the lower surface to the upper surface by passing through an overlapped portion where the first opening and the second opening are overlapped;

wherein a reflectively of reflective layer is higher than a reflectivity of light absorbing layer, so that the reflective layer makes the light not entering the second opening substantially reflected back to the light guiding plate without being absorbed by the light absorbing layer.

10. The lighting keyboard of claim 9, wherein a center of the second opening, a center of the keyswitch and a center of the first opening substantially align with each other.

11. The lighting keyboard of claim 9, wherein a color of the light absorbing layer is substantially darker than a color of the reflective layer.

12. The lighting keyboard of claim 11, wherein the light absorbing layer is substantially black and the reflective layer is substantially white.

13. The lighting keyboard of claim 9, wherein a shape of the second opening is substantially same as a shape of the first opening.

14. The lighting keyboard of claim 9, further comprising a reflecting plate disposed under the light guiding plate.

15. The lighting keyboard of claim 9, wherein the support layer is made of transparent material, the support layer extends over the overlapped portion where the first opening and the second opening are overlapped, the light travels from the lower surface to the upper surface by passing through the support layer.

16. The lighting keyboard of claim 9, wherein the support layer comprises a third opening at least overlapping the first opening and the second opening, the light travels from the lower surface to the upper surface by passing through an overlapped portion where the first opening, the second opening and the third opening are overlapped.

17. The lighting keyboard of claim 9, wherein a center of the second opening substantially aligns with a center of the first opening.

* * * * *